(No Model.)  3 Sheets—Sheet 2.
W. RAEUCHLE.
BUTTON HOLE SEWING MACHINE.
No. 341,168.  Patented May 4, 1886.
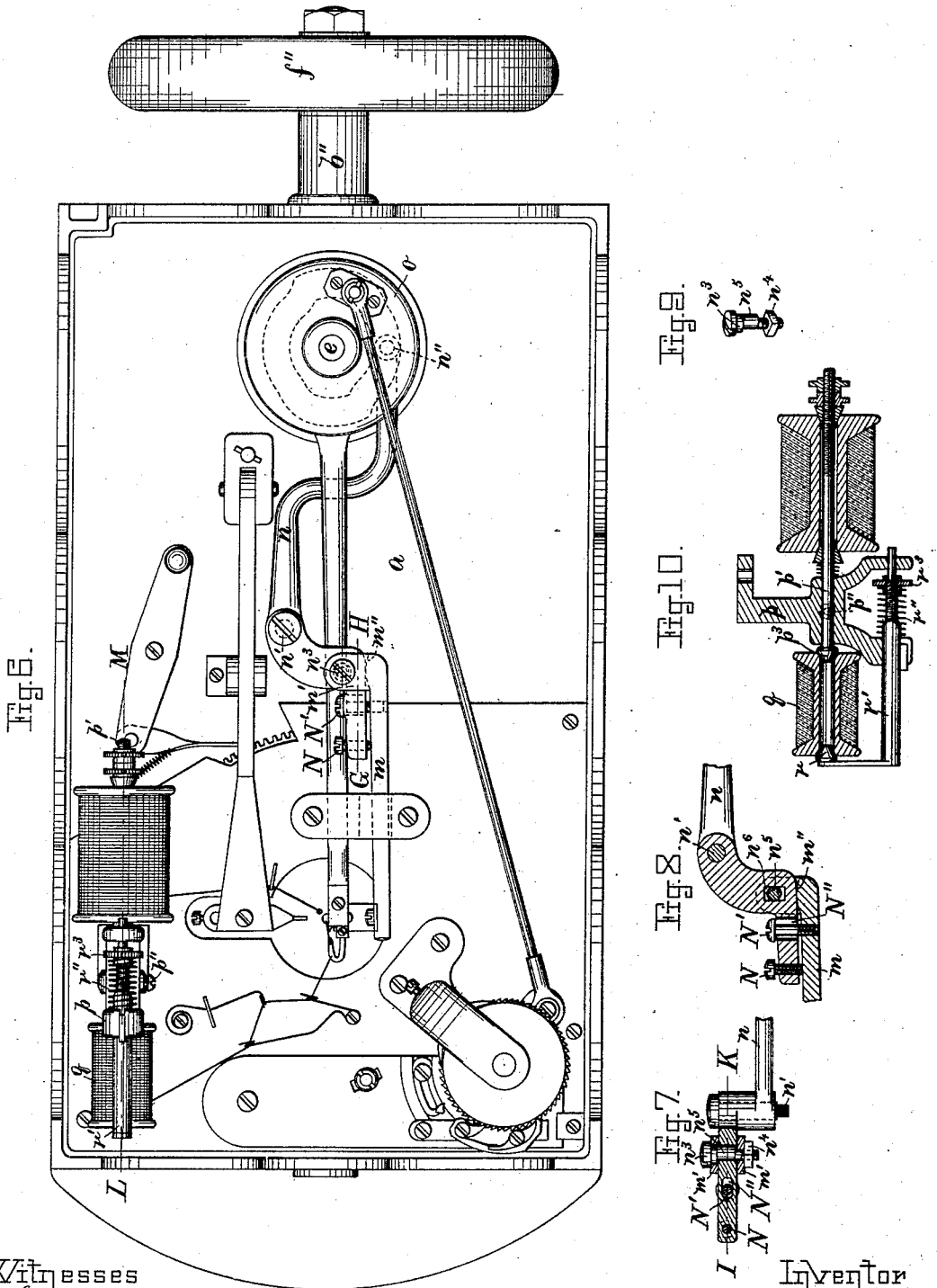

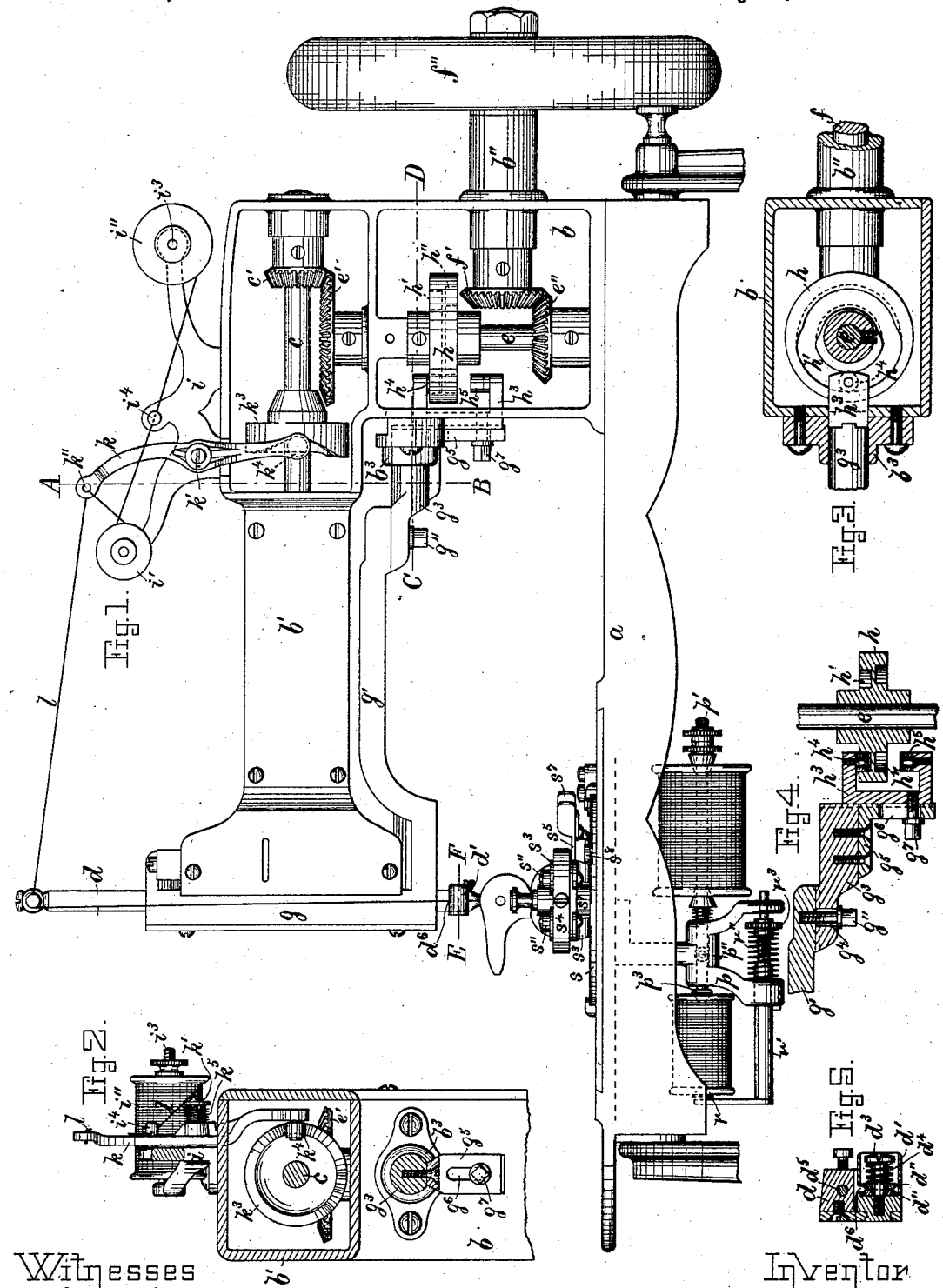

(No Model.) 3 Sheets—Sheet 3.
W. RAEUCHLE.
BUTTON HOLE SEWING MACHINE.

No. 341,168. Patented May 4, 1886.

Witnesses
Henry Chadbourn.
John H. Foster.

Inventor
William Raeuchle.
by Alban Andrén, his atty

UNITED STATES PATENT OFFICE.

WILLIAM RAEUCHLE, OF BOSTON, MASSACHUSETTS.

BUTTON-HOLE SEWING-MACHINE.

SPECIFICATION forming part of Letters Patent No. 341,168, dated May 4, 1886.

Application filed March 12, 1885. Serial No. 158,516. (No model.)

*To all whom it may concern:*

Be it known that I, WILLIAM RAEUCHLE, a citizen of the United States, residing at Boston, in the county of Suffolk and State of Massachusetts, have invented certain new and useful Improvements in Button-Hole Sewing-Machines; and I do hereby declare that the same are fully described in the following specification and illustrated in the accompanying drawings.

This invention relates to improvements in button-hole sewing-machines; and it is carried out as follows, reference being had to the accompanying drawings, where—

Figure 13:
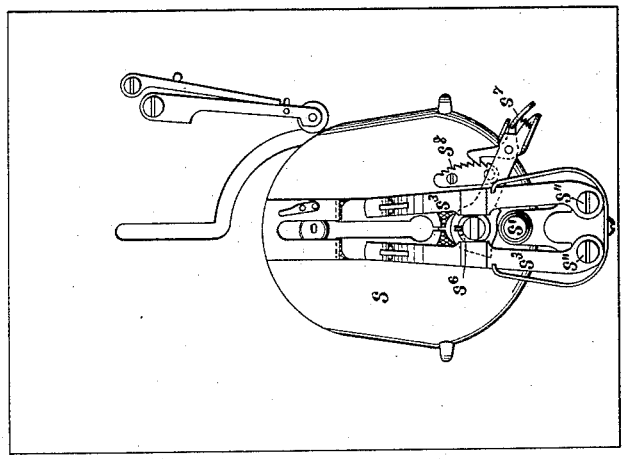
Figure 12:
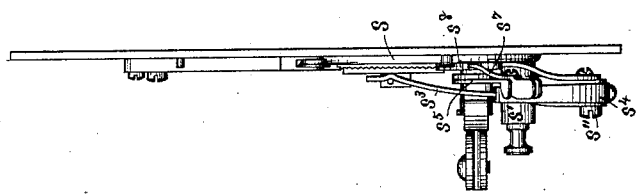
Figure 11:
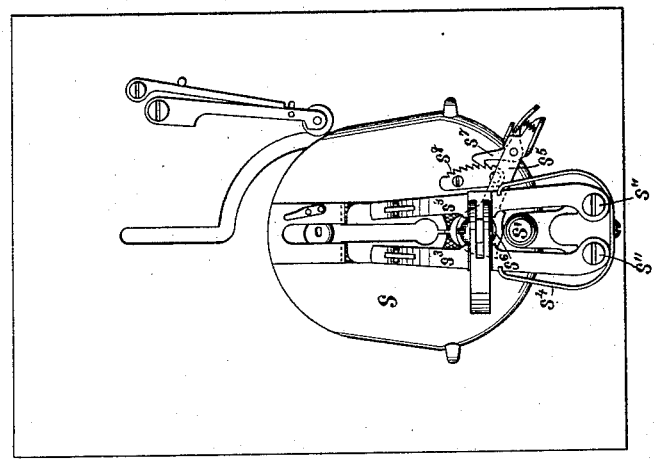

Figure 1 represents a side elevation of the machine. Fig. 2 represents a vertical section on the line A B, shown in Fig. 1. Fig. 3 represents a cross-section on the line C D, shown in Fig. 1. Fig. 4 represents an adjustable cam-connecting device, whereby either one of two cams of different sizes may be brought into operation for producing vibratory movements of the reciprocating needle-bar. Fig. 5 represents an enlarged cross-section on the line E F, shown in Fig. 1. Fig. 6 represents a bottom view of the machine. Fig. 7 represents a section on the line G H in Fig. 6, showing the adjustable spreader-lever. Fig. 8 represents a section on the line I K, shown in Fig. 7. Fig. 9 represents a perspective view of the cam-bolt on the spreader-lever. Fig. 10 represents a longitudinal section of lower tension device on the line L M, shown in Fig. 6. Fig. 11 represents a plan view of the clamps. Fig. 12 represents a side elevation of the said clamps, and Fig. 13 represents a plan view of the clamps with the clamping-cam removed.

Similar letters refer to similar parts wherever they occur on the different parts of the drawings.

$a$ is the work-supporting table or horizontal part of the frame, as usual, and $b$ $b'$ represent the goose-neck of the machine in the ordinary manner.

$c$ is the horizontal shaft located in bearings in the goose-neck portion $b'$, which shaft is the means of operating the needle-bar $d$ up and down, as usual. The shaft $c$ has attached to it the pinion $c'$, gearing into the teeth of gear-wheel $e'$, that is attached to the upper end of vertical shaft $e$, located in bearings in the goose-neck portion $b$, as shown in Fig. 1.

$e''$ is a gear-wheel secured to vertical shaft $e$ and gearing into gear-wheel $f'$, secured to horizontal driving-shaft $f$, that is supported in the bearing $b''$ on the goose-neck part $b$, and is provided in its outer end with the driving or balance wheel $f'''$ in the ordinary way. The needle-bar $d$ is guided up and down in the horizontally-adjustable guide-block, $g$, the lower end of which is attached to or made in one piece with the horizontal connecting-rod $g'$, that is moved forward and back in a horizontal direction with a variable throw, so as to vibrate the reciprocating needle-bar more or less, according to the desired depth of the stitches to be formed in the material in which the button-holes are to be made. To impart such motion to connecting-rod $g'$, I secure to the shaft $e$ a double-faced cam-disk, $h$, having an upper cam-groove, $h'$, and a lower cam-groove, $h''$, (shown in Fig. 4,) one of such cam-grooves being made with a throw larger than the other. To the inner end of connect-rod $g'$ is secured, by means of set-screw $g''$, the block $g^3$, which can be adjusted horizontally in relation to the connecting-rod $g$ as may be required, for which purpose a slotted perforation, $g^4$, is made through block $g^3$, for the set-screw $g''$ to pass through, as shown in Fig. 4. To the under side of block $g^3$ is secured the bracket $g^5$, having a vertical slot-hole, $g^6$, through which passes loosely the set-screw $g^7$, the inner end of which is screwed into the vertically-adjustable frame $h^3$, having a pin and roll, $h^4$, in its upper end and a similar pin and roll, $h^5$, in its lower end, as shown in Fig. 4. By adjusting the position of the frame $h^3$ in relation to the bracket $g^5$ the lower pin and roll, $h^5$, may be inserted in the lower cam-groove, $h''$, on cam $h$, or the upper pin and roll, $h^4$, may be inserted in the upper cam-groove, as may be desired, and as one of said cam-grooves has a greater pitch or throw than the other it will be seen that the connecting-rod $g'$, needle-block $g$, and needle-bar $d$ will be vibrated more or less, according to the required depth of the stitch on the edge of the button-hole.

The rear end of the piece $g^3$ is guided and supported in the bearing $b^3$, secured to gooseneck portion $b$, as shown in Figs. 1, 2, and 3.

To the top of goose-neck $b'$ is secured a frame or bracket, $i$, having in its forward end the usual tension-disks, $i'$, and in its rear end the spool $i''$, mounted loosely on the spindle $i^3$. About midway between them is located the thread-guide $i^4$. (Shown in Figs. 1 and 2.)

To one side of bracket $i$ is hung upon the pin $k'$ the lever $k$, the upper end of which has an eye, $k''$, for the thread $l$ to pass through, and in its lower end it has a pin and roll, $k^4$, actuated by the cam-disk $k^3$, secured to shaft $c$, as shown in Figs. 1 and 2. The lower end of lever $k$ is yieldingly held against the face of the cam $k^3$ by the influence of the coiled spring $k^5$, located on the stud or pin $k'$, or it may be so operated by means of any other suitable spring, coiled, flat, or elliptic. The cam $k^3$ is so shaped that by its action no nippers are required on the needle-bar carrier, because at the time that the needle rises to make the loop the take-up lever $k$ slackens the thread sufficiently to allow the loop to be made.

The spreader-bar is made in two parts, $m$ and $n$, the latter being hung on the fulcrum-pin $n'$, secured to the under side of the plate $a$, as shown in Fig. 6, and provided in its rear end with a pin and roll, $n''$, actuated by the grooved cam-disk $o$, secured to the lower end of shaft $e$. The longitudinal adjustment of the spreader-lever is obtained by means of the bolt $n^3$, the ends of which rest in the perforated ears $m'$ in the rear end of lever $m$, and to which it is firmly secured by means of nut $n^4$. (Shown in Fig. 7.) Midway between its ends the bolt $n^3$ has an eccentric cam, $n^5$, (shown in Figs. 7, 8, and 9,) such eccentric portion of the bolt $n^3$ passing through a slotted perforation, $n^6$, in the end of lever $n$, as shown in Fig. 8, and it will thus be seen that the lever $m$ can be adjusted longitudinally in relation to the lever $n$ simply by turning the bolt $n^3$ a little around its axis, and after the desired adjustment is obtained the said bolt $n^3$ is firmly secured in position by tightening the nut $n^4$.

For the purpose of adjusting the spreader-lever in a lateral direction, I employ two screws, N and N', the former screwed through the projecting end of lever $n$ and having its end pressing against the side of lever $m$, as shown in Figs. 6 and 8. The latter screw, N', passes loosely through a slotted perforation, N'', in lever $n$, its end being screwed into a screw-threaded perforation in lever $m$, as shown in said Figs. 6 and 8. The rear end of lever $m$ has a curved seat, $m''$, on which rests the lever $n$, as shown in Fig. 8. By tightening screw N and loosening screw N', or vice versa, the proper position of the lever $m$ in relation to lever $n$ in a lateral direction can easily be obtained.

To the needle-bar $d$, at its lower end, is secured the shell $d'$, in which are located the tension-disks $d''$ $d''$, upon the screw $d^3$, the said disks being held against each other with a proper tension by means of tension-spring $d^4$, as shown in Fig. 5. The disks $d''$ $d''$ are located in a line with the needle $d^5$, and opposite to the latter is made a slotted perforation, $d^6$, on the shell $d'$, to permit the thread to enter the latter from above, and to pass between the disks $d''$ $d''$ around the pin $d^3$ on its way to the eye in the needle end. By this arrangement the thread is caused to draw across the pin $d^3$, instead of against the disks themselves, the latter only serving the purpose of pinching the thread to cause sufficient tension to resist the weight of the thread.

To the under side of the bed-plate $a$ is secured the bracket $p$, in which is located the horizontal spindle $p'$, such spindle being laterally adjustable in said bracket and secured by means of a screw, $p''$. (Shown in Figs. 6 and 10.) One end of said spindle $p'$ has a conical head, $p^3$, serving as a support for one end of the lower spool, $q$, the other end of said spool being supported on the conical projection $r$, attached to the bent end of the longitudinally-yielding spindle $r'$, that is supported in the forked lower end of bracket $p$, and there provided with a tension-spring, $r''$, and a regulating thumb-nut, $r^3$, as shown in Fig. 10. The tension-spring $r''$ causes the spool $q$ to be held on the stationary conical projections $p^3$ $r'$ with more or less tension, as required.

In Figs. 11, 12, and 13, $s$ is the clamp-plate with its post $s'$, to which is hinged at $s''$ $s''$ the clamp-arms $s^3$ $s^3$, such arms being pressed toward each other by means of springs $s^4$ in the usual manner. The arms $s^3$ $s^3$ are spread from each other, as usual, by means of the spreader-arm $s^5$, having the usual cam or eccentric, $s^6$, arranged between the clamp-arms, as shown in Figs. 11 and 13.

To the outer end of spreader-arm $s^5$ is hinged the spring-actuated pawl-lever $s^7$, the inner end of which is made to engage in the toothed rack $s^8$, secured to plate $s$, as shown in said Figs. 11 and 13.

By the employment of spring-pawl $s^7$ and rack $s^8$ the arm $s^5$ can be secured in any desired position after the clamp-arms $s^3$ $s^3$ have been spread apart the desired distance.

Having thus fully described the nature, construction, and operation of my invention, I wish to secure by Letters Patent, and claim—

1. In a button-hole sewing-machine, the herein-described adjustable vibrating devices, consisting of the rotary cam $h$, having the unequal cam-grooves $h'$ and $h''$, formed in its opposite faces, in combination with the vertically-adjustable frame $h^3$, and its pins and rolls $h^4$ $h^5$, the needle-bar, the connecting-rod, $g'$, carrying the frame $h^3$, the shaft carrying the rotary cam, and means for rotating said shaft, or a projection thereon, as and for the purpose set forth.

2. The combination, with the reciprocating needle-bar carrying an eye-pointed needle, of a connecting-rod actuated by a cam on the main shaft and giving vibration to the needle-bar, the looper or loop-spreader and the spreader-lever, composed of the parts $m$ and $n$, the bolt $n^3$, having a cam, $n^5$, and the adjusting-screws N N'.

3. The combination, with the clamp-plate $s$, of the clamp-arms $s^3$, pivotally mounted at $s''$, springs $s^4$, by which said arms are normally thrown toward each other, the cam $s^6$, the actuating-arm $s^5$, the spring-actuated pawl $s^7$, and rack $s^8$, mounted on the plate $s$, substantially as described.

In testimony whereof I have affixed my signature in presence of two witnesses.

WILLIAM RAEUCHLE.

Witnesses:
ALBAN ANDRÉN,
HENRY CHADBOURN.